UNITED STATES PATENT OFFICE.

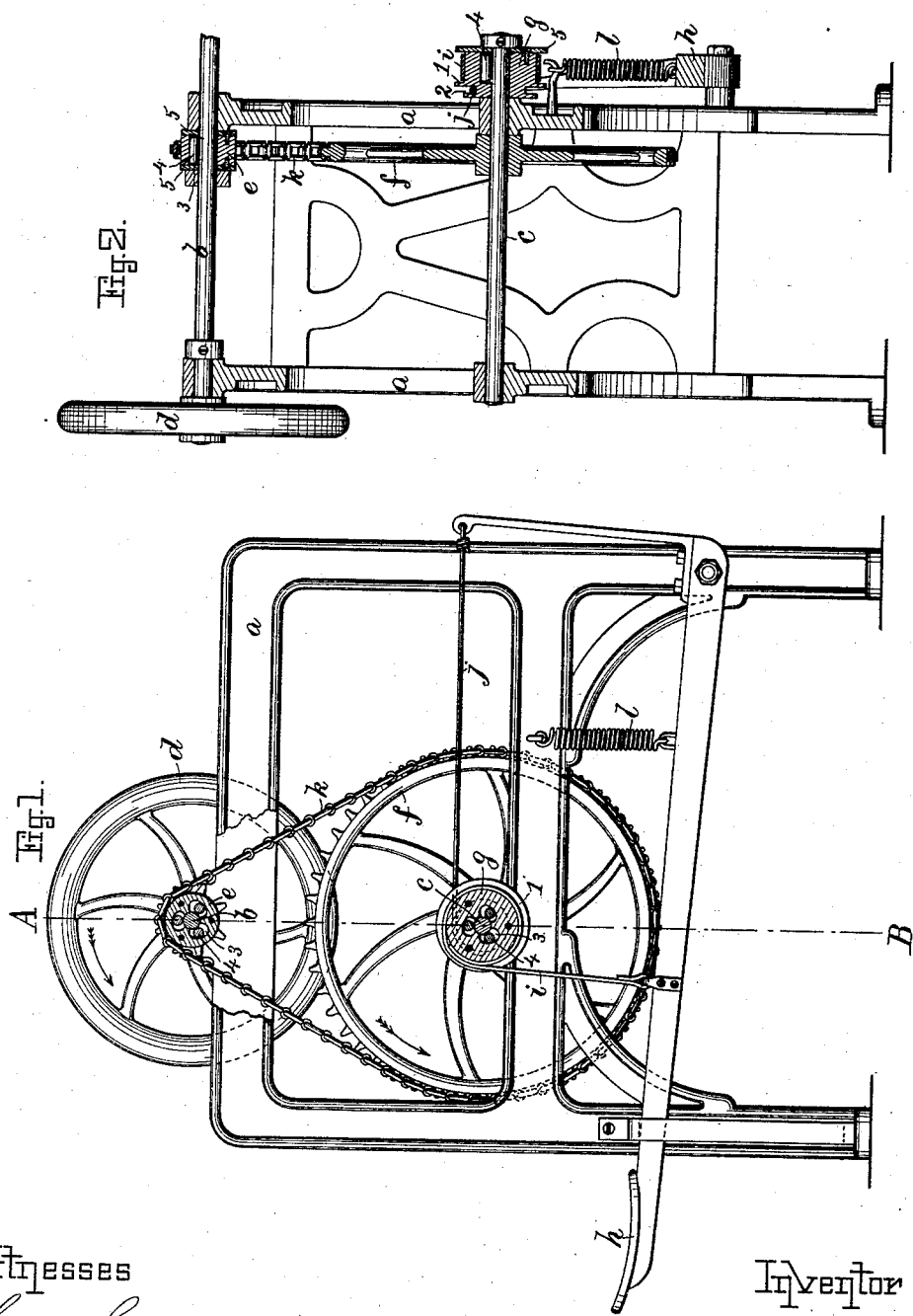

WILLIAM L. PERRY, OF CHELSEA, ASSIGNOR, BY MESNE ASSIGNMENTS, OF ONE-HALF TO BLOUNT & KIMPTON, OF BOSTON, MASSACHUSETTS.

FOOT-POWER MACHINE.

SPECIFICATION forming part of Letters Patent No. 338,437, dated March 23, 1886.

Application filed September 19, 1885. Serial No. 177,518. (No model.)

*To all whom it may concern:*

Be it known that I, WILLIAM L. PERRY, a citizen of the United States, residing at Chelsea, in the county of Suffolk and State of Massachusetts, have invented certain new and useful Improvements in Foot-Power Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This improvement relates to foot-power mechanism for driving machinery—such as saws, lathes, sewing-machines, and any kind of light machinery requiring moderate power and high speed.

The invention consists in a novel construction and combination of parts, whereby a less expenditure of power exerted by the operator is required to drive the machinery at a proper rate of speed, all of which will now be fully described and claimed.

In the accompanying drawings, Figure 1 is a side elevation of the machine, showing the two clutches in section, the frame being broken away at the top for this purpose. Fig. 2 is a cross-section of the machine on the line A B. (Shown in Fig. 1.)

Similar letters of reference indicate corresponding parts.

$a$ is a suitable frame, having an upper cross-shaft, $b$, and lower cross-shaft, $c$, each supported in suitable bearings. The shaft $b$ is the driven shaft, and has fast thereon the fly-wheel $d$, and has also the loose clutch $e$. The shaft $c$ has fast thereon the large wheel $f$, and has also the loose clutch $g$, the face of which is grooved or made in the form of two flanged pulleys, 1 and 2.

$h$ is the treadle, made in bell-crank form, and pivoted between its ends to the frame $a$. From the treadle $h$ a strap, $i$, extends to and around the flanged face 1 of the treadle-clutch $g$; also a cord, $j$, extends from the opposite end of the treadle $h$ to and around the flanged face 2 of the said clutch. Thus it will be seen the strap $i$ and cord $j$ are attached to opposite ends of the lever or treadle $h$, and pass in opposite directions around the clutch-faces 1 and 2, to which they are made fast, the said faces being made of such diameters with relation to the throw or movement of the points of attachment to the treadle of the strap and cord that they are kept taut as the treadle is vertically vibrated, and are caused to wind and unwind upon and thus oscillate the clutch $g$. The clutches $e$ and $g$ are formed at the sides of their central shaft-holes with tangential apertures 3, extending through the hubs from end to end and open into the central hole. Small rolls 4 are placed within said apertures, and as the clutches are revolved in one direction the rolls are caused to wedge and lock together firmly the clutch and shaft, but will instantly release themselves on reversing the motion. End plates, 5, fastened on the hubs of the clutches prevent the loose rolls from dropping out. The faces of the clutch $e$ and the large wheel $f$ are provided with projections, in the usual manner, for interlocking with the endless chain or belt $k$, which transmits the power from one to the other.

In operation, the treadle $h$ being pressed down, the strap $i$, as it unwinds, turns the clutch $g$, which locks and turns with it the shaft $c$ and wheel $f$, fast thereon, and through the endless chain or belt $k$ turns the clutch $e$, which locks and turns with it the shaft $b$ and its attached fly-wheel. This movement of the clutch $g$ winds up the cord $j$, which, upon a reverse movement of the treadle by the spring $l$, revolves the clutch back into its former position; but the shaft $c$, with its large wheel $f$, is free to continue its revolutions from its own momentum, and even after stopping to revolve, the upper shaft, $b$, yet continues, and is free to revolve independently as long as the momentum of its fly-wheel will carry it. It will therefore be seen that with this construction the shafts and their wheels all revolve in one and the same direction, thus utilizing the momentum of the moving parts, and, furthermore, admitting of using a very light spring, $l$, to restore the treadle and treadle-clutch to their normal position, and thereby requiring less exertion to operate the machine.

It must be apparent that the treadle might be raised by a counter-weight, instead of the spring, if so preferred, and any other style of clutch might be used with a different form of treadle; also, the shafts *b* and *c* may be connected by other means—such as a plain belt, or by gearing—all of which can be done without departing from the essential features and spirit of this invention.

I claim—

1. The shaft *c*, suitable bearings therefor, and the clutch *g*, adapted to be oscillated thereon and revolve said shaft in one direction, combined with the shaft *b*, suitable bearings therefor, and the clutch *e* thereon, adapted to revolve its shaft in one direction, and mechanism, substantially as described, for connecting and transmitting motion from one shaft to the other, as set forth.

2. The shaft *c*, suitable bearings therefor, chain-wheel *f*, fast thereto, and a clutch adapted to oscillate thereon and revolve said shaft in one direction, combined with the shaft *b*, suitable bearings therefor, and a clutch thereon adapted to be driven by an endless chain, *k*, and revolve said shaft in one direction, all substantially as and for the purpose set forth.

3. In a foot-power machine, the combination of a frame, *a*, cross-shafts *b* and *c*, clutches *e* and *g*, wheels *d* and *f*, chain or belt *k*, treadle *h*, strap *i*, cord *j*, and spring *l*, all combined to operate substantially as set forth, whereby the shafts revolve in but one direction, thus utilizing the momentum of the moving parts, and dispensing with the powerful springs usual for reversing and returning the mechanism to its normal position, as set forth.

4. In a foot-power machine, the treadle *h*, made in the form of a bell-crank lever, combined with the shaft *c* and clutch *g*, adapted to be oscillated thereon by the alternate action of the strap *i* and cord *j*, attached to opposite ends of the lever or treadle, and thus revolve said shaft in one direction as the treadle is depressed by the operator, and returned by means substantially as and for the purpose set forth.

In testimony whereof I have affixed my signature in presence of two witnesses.

WILLIAM L. PERRY.

Witnesses:
 B. M. ANGEOINE,
 E. H. SPAULDING.